March 30, 1954  J. CALVI  2,673,609
ELECTRICALLY OPERATED PROGRAMMING APPARATUS
Filed Aug. 4, 1950  2 Sheets-Sheet 1
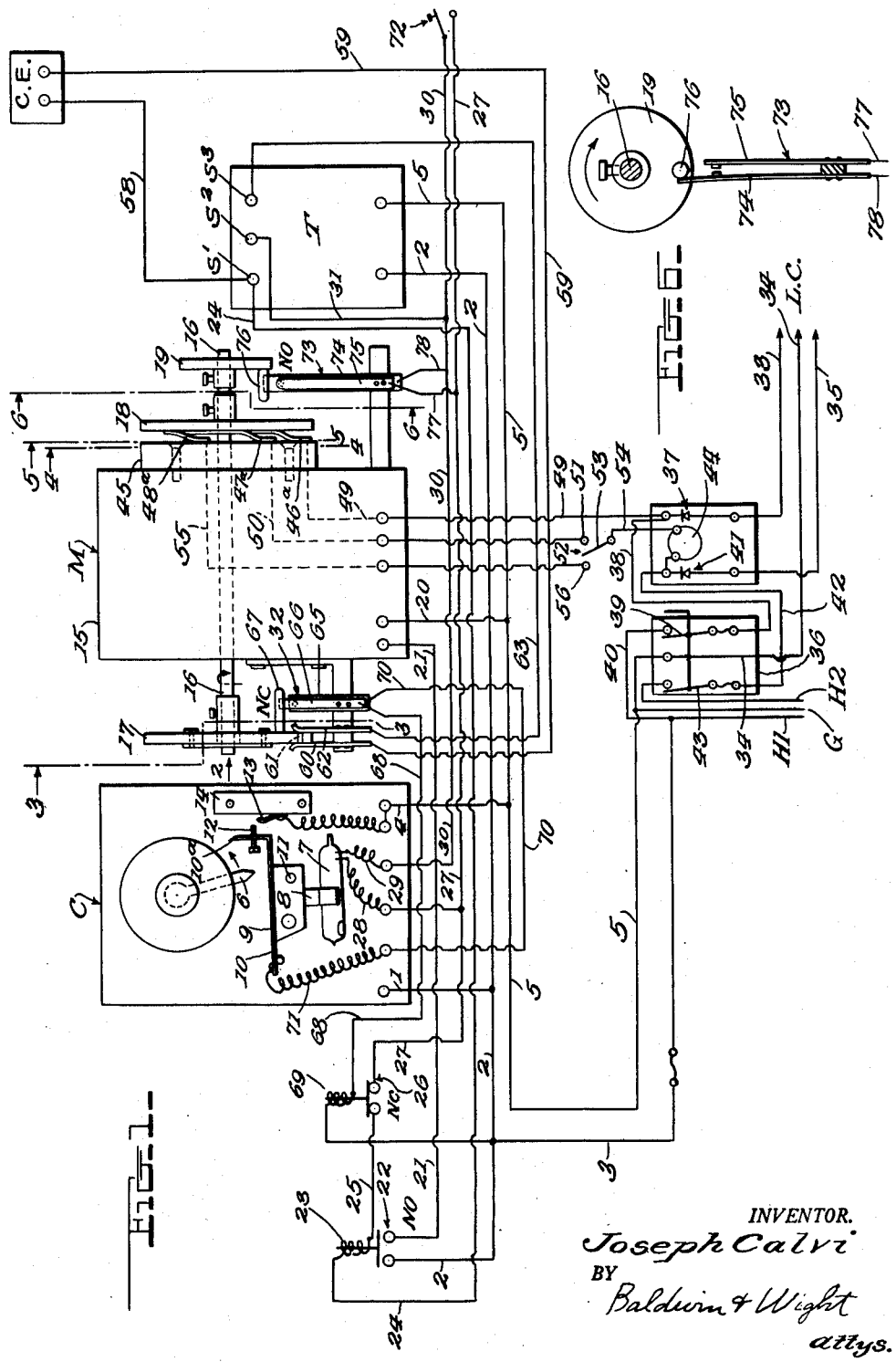
INVENTOR.
Joseph Calvi
BY
Baldwin & Wight
attys.

March 30, 1954  J. CALVI  2,673,609
ELECTRICALLY OPERATED PROGRAMMING APPARATUS
Filed Aug. 4, 1950  2 Sheets-Sheet 2
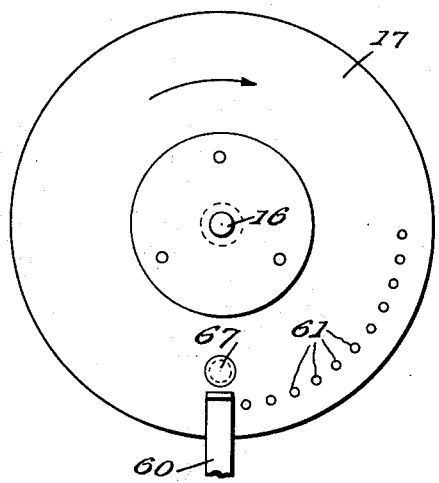
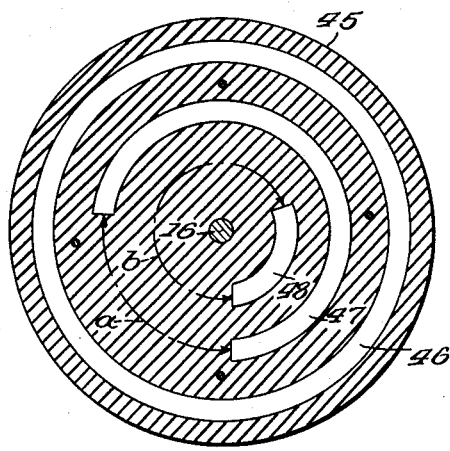
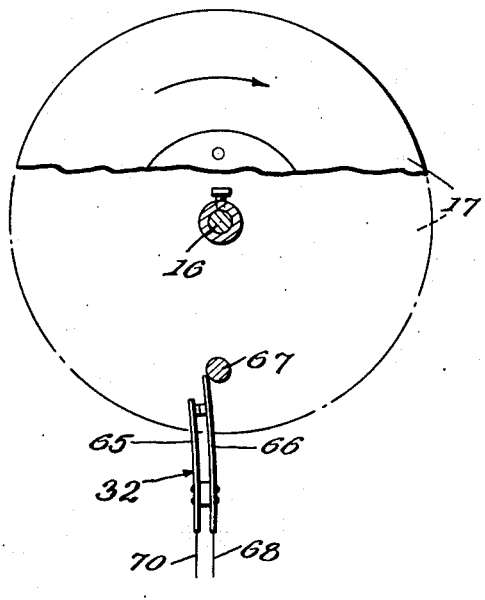
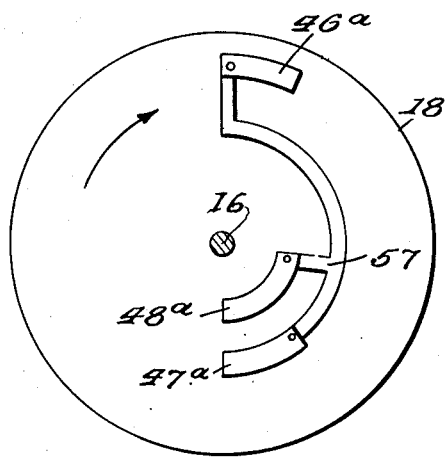
INVENTOR.
Joseph Calvi
BY Baldwin & Wight
attys.

Patented Mar. 30, 1954

2,673,609

UNITED STATES PATENT OFFICE 2,673,609

ELECTRICALLY OPERATED PROGRAMMING APPARATUS

Joseph Calvi, Ventnor, N. J.

Application August 4, 1950, Serial No. 177,754

7 Claims. (Cl. 161—1)

This invention relates to electrically operated programming apparatus, and more particularly to cyclically operable apparatus capable of controlling an electrical circuit or circuits in a manner to cause a predetermined sequence of operations during each cycle. The invention embodies improvements which may be incorporated, for example, in a programming apparatus including a motor driven switching mechanism and suitable means for starting the mechanism when it is desired that a cycle of operations be performed, and for stopping the mechanism at the end of the cycle. The apparatus may include a clock for automatically starting the switching mechanism at a particular time or a manually operable switch for starting the mechanism whenever desired, or both a clock operated and a manually operable starting switch.

An object of the invention is to provide apparatus of the general character referred to including improved switching and control mechanism capable of effecting very accurately timed operating cycles and sequences of controlled operations.

Another object of the invention is to provide such an apparatus including a novel and improved arrangement of co-related switches operated respectively by a clock and by a motor driven switching mechanism for stopping the operation of the switching mechanism and terminating a cycle of operations.

Another object of the invention is to provide improved apparatus of the class referred to arranged to impose a control on a light circuit for a predetermined period during a cycle, and to effect operation of audible equipment, such as chimes, in timed relation to the controlling of the light circuit.

A further object of the invention is to provide improved programming apparatus including a device for enabling selection of one of a plurality of timing sequences to be effective during a cycle of a motor driven switching mechanism.

Other objects will become apparent from a reading of the following description of a representative embodiment of the invention, the appended claims, and the accompanying drawings, in which:

Figure 1 is a wiring diagram and a schematic showing of switching and related mechanism embodying the invention;

Figure 2 is an end elevation of a motor driven disc and related parts for controlling certain operations, the parts being shown as viewed when looking in the direction of the arrow 2 in Figure 1;

Figure 3 is a detail section on the line 3—3 of Figure 1;

Figure 4 is a detail section on the line 4—4 of Figure 1;

Figure 5 is a detail section on the line 5—5 of Figure 1; and

Figure 6 is a detail section on the line 6—6 of Figure 1.

A preferred embodiment of the invention is shown in the drawings as being capable of automatically operating signalling or control circuits for lights and audible means, e. g. chimes, bells, or the like, during a predetermined period of each day and in accordance with a desired program or sequence. The disclosed apparatus is adapted for various uses and may, for example, be used for automatically turning out lights and operating chimes in lodges, clubs, or the like in cases in which it may be desirable that a particular sequence of light control and chiming operations occurs beginning at a specific time each day, say at 11 p. m. In a representative instance the lights may be turned out for a predetermined period beginning at 11 p. m., during which chimes will sound a predetermined number of times, and the lights are then automatically restored to the normal building controls at the completion of the cycle. The arrangement is such that these operations will take place automatically at exactly the same time every day. Although the particular apparatus disclosed as an illustrative embodiment of the invention is intended to carry out the functions outlined above, it will be understood that apparatus embodying the invention may be used for other purposes, and that its particular construction or arrangement of parts may be varied within the scope of the invention so as to be adapted for the controlling of operations in accordance with different sequences.

The apparatus disclosed in the drawings is connected to a three-wire power supply line comprising a "hot" line H1, a second "hot" line H2 and a neutral or ground line G, all shown at the bottom of Figure 1. A main electrical circuit to be controlled, e. g. a light circuit generally designated L. C. is connected to or includes the lights or a particular set of lights in a building. A set of chimes or chime equipment C. E. in a supplemental circuit to be controlled is adapted to be controlled concurrently or in timed relation with the control of the light circuit L. C. A transformer T is provided for supplying reduced voltage, say 16 volts, to the chime equipment C. E. and to supply reduced voltage, say 12 volts, for operating certain control mechanism to be described later. Mechanism for turning out the lights for a predetermined period and operating the chimes during this period includes a clock or timing device generally designated C and motor driven mechanism generally designated M controlled by the clock C.

In accordance with the general plan or sequence of operation, at a certain time each day, say at 11 p. m., the clock C operates switching mechanism which starts the motor driven mechanism M. The mechanism M, upon being started, immediately turns the lights out and leaves the building darkened until the motor has run for a predetermined or selected period at the end of which the lights are turned on again. During the lights out period, mechanism operated by the motor driven mechanism M intermittently closes and opens a circuit to the chime equipment C. E. When the motor driven mechanism M has completed a cycle, the control circuit, previously enabled by the clock C, is disabled and the motor M is stopped. At this time the lights will be turned on and the switching mechanism controlling the chimes will be disabled.

Clock

The clock or timing mechanism C, shown schematically, may be of any conventional or suitable construction adapted to operate through a complete cycle once every 24 hours. The clock C need not be provided with a dial or face or with hands, since its function is to operate switching mechanism rather than to give a visual indication of the time. The clock C is permanently connected by conductors 1, 2 and 3 to one side H1 of the power line, and by conductors 4 and 5 to the ground line G. Thus the clock C runs continuously.

The clock has a finger 6 adapted to make a complete revolution or go through one cycle once every 24 hours, and at a particular time in each cycle to operate a mercury switch 7 held in a clip 8 fixed to a bracket 9 carried by an arm 10 mounted to rock about a fixed pivot 11. The assembly including the arm 10, bracket 9, clip 8 and switch 7 is so balanced that normally it will be in the position shown in Figure 1, with the mercury globule at the left end of the switch tube so that the switch will be open. When the arm 10 is in its normal position illustrated in Figure 1, an adjustable contact screw 12 carried by an upwardly projecting tip 10a on the arm will be disposed out of contact with a yieldable contact finger 13 mounted on a fixed insulating block 14. In operation, when the finger 6 moves counterclockwise from the position shown in Figure 1, it engages the arm tip 10a so as to rock the arm 10 clockwise about the pivot 11 until the mercury switch 7 is tipped sufficiently to cause the mercury globule to move to the right end of the switch 7 and close a circuit controlled by the switch 7 for effecting operations to be described later. At the instant the switch 7 is closed the contact screw 12 will not have moved into engagement with the contact finger 13. However, during continued rotation of the clock finger 6 the arm 10 will be tipped further so as to close the contact screw 12 upon the flexible contact 13 while the mercury switch remains closed. Thus the switch 7 and the switch constituted by the contacts 12 and 13 will be closed sequentially and, as explained hereinafter, these switches will remain closed during the operation of the remainder of the apparatus. After the close of this period, the pointer 6 will move beyond the arm tip 10a enabling the switch assembly 10, 9, 8, 7, and 12 to rock back to their normal positions in which both the switch 7 and the switch 12—13 will be open.

Transformer

The transformer T may be of any conventional or suitable kind and is permanently connected across the supply line by the conductor 5 leading to the ground G and the conductors 2 and 3 leading to the power line H1. The transformer T comprises secondary terminals S1, S2, and S3, the terminals S1 and S2 together providing a source of 12 volt potential for operating relays and contacters to be described, and the terminals S1, S3 providing a source of 16 volt potential for operating the chime equipment C. E.

Motor driven switching mechanism

The motor driven switching mechanism M includes a casing 15 enclosing a constant speed electric motor and reduction gearing (not shown) adapted to drive a cyclically operable shaft 16 equipped with discs 17, 18, and 19 for respectively controlling the chime equipment C. E., the light circuit L. C., and means for restoring the parts to normal positions at the end of a cycle or complete revolution of the shaft 16. The particular construction of the discs 17, 18 and 19 and the cooperation of these discs with other parts for effecting the control functions will be described later.

Starting and stopping of motor driven switching mechanism

One terminal of the motor driven mechanism M is connected by a conductor 20 to the conductor 5 previously referred to and so is connected to the ground line G. The other motor terminal is connected by a conductor 21 to a normally open relay 22 which also is connected to the conductor 2 previously referred to as leading to the conductor 3 and the supply line H1. Hence, if the relay 22 is closed, the motor M is connected across the high voltage line H1–G.

The relay 22 has a coil 23, one end of which is connected by a conductor 24 to the secondary terminal S1 of the transformer T. The other end of the coil 23 is connected to a conductor 25 which leads through a normally closed relay 26 to a conductor 27 and a flexible conductor 28 to one side of the mercury switch 7. The other side of the switch 7 leads through conductors 29, 30, and 31 to the secondary terminal S2 of the transformer T. When the mercury switch 7 is rocked clockwise by the finger 6, as previously described, so as to close the switch, the relay coil 23 will be connected across the 12 volt secondary terminals S1 and S2 of the transformer T, the coil 23 thereby being energized so as to close the normally open relay and start the motor M. This will turn out the lights and start a sequence of chime operations in a manner particularly to be described later, and also will open a normally closed switch generally designated 32, the subsequent closing of which at the end of a cycle will stop the motor M and restore the apparatus to normal condition.

Light circuit controls

The light circuit L. C. comprises three conductors 33, 34, and 35, the middle or neutral wire 34 of which leads through a double pole switch box 36 to the conductor 5 and ground G. The conductor 33 leads through a normally closed relay contactor 37 to a conductor 38, a switch blade 39 of the switch 36, and a conductor 40 to the power line H1. The light circuit conductor 35 leads through another normally closed relay contacter 41 to a conductor 42, a switch blade 43, and thence to the power line H2. Thus when the double pole 39—43 is closed, and the relay contacters 37 and 41 are closed as normally is the case, the light circuit L. C. is energized. The turning out of the lights is effected by de-energizing a normally energized coil 44 in a manner to be described so as to open the contacters 37 and 41.

The illustrated mechanism for controlling the energizing of the relay coil 44 includes a device comprising the disc 18 previously referred to as being mounted on the shaft 16, and a stationary disc 45 secured to the casing of the mechanism M. The disc 45 is formed of insulating material such as Bakelite and, as shown in Figure 4, is equipped with three arcuate conducting segment parts or strips 46, 47, and 48 which preferably are mounted in recesses formed on the outer face of the disc. The strip 46 is formed as a complete circle, the strip 47 as approximately three-fourths of a circle, and the strip 48 as approximately one-fourth of a circle, but the extents of the strips 47 and 48 may be varied according to the particular timing of operations desired. As shown in Figure 4, the two strips 47 and 48, although being of different arcuate extents, have two of their respective ends substantially aligned.

The strip 46 is connected by a conductor 49 to the conductor 38 and thence to the switch blade 39, the conductor 40 and the power line H1. The strip 47 is connected through a conductor 50 to one contact point 51 of a selector switch 52. The selector switch includes an arm 53 connected to a conductor 54 which leads to one side of the relay coil 44. The other side of the coil 44 is connected to the conductor 42 and thence through the switch blade 43 to the power line H2. The strip 48 is connected to a conductor 55 which leads to another contact 56 of the selector switch 52.

Inasmuch as one side of the relay coil 44 is permanently connected to the line H2, connecting the other side of the coil 44 to the line H1 will cause the coil to be energized so as to close the adjustable control device comprising the relay contacts 37 and 41 to maintain the light circuit L. C. energized. When, however, the circuit through the relay coil 44 is broken and the coil is de-energized, the relay contactors 37 and 41 are opened so as to de-energize the light circuit L. C. For controlling the energizing and de-energizing of the relay coil 44, the disc 18 is equipped with three spring brush parts 46ª, 47ª and 48ª which normally contact respectively the segments or strips 46, 47, and 48. The three brushes are connected to each other electrically by a strip 57 which may be formed integrally with the brushes. The brushes are fixed to and turn with the disc 18 and cooperate with the strips 46, 47, and 48 so as to provide either a long or short selected period of de-energization of the relay coil 44, the length of the period being selected by setting the selector switch 52. If a short period is desired, the switch blade 53 of the selector switch is set to engage the contact point 51; and if a long period is desired the switch blade 53 is set to engage the contact point 56. When the parts are at rest, that is, before the clock C has operated the mercury switch 7 to start the motor M, the brush 46ª will be in engagement with the strip 46, the brush 47ª with the strip 47, and the brush 48ª with the strip 48. Since the strip 46 is continuous the associated brush 46ª will always engage it, but the brushes 47ª and 48ª will engage the respectively associated strips 47 and 48 only during portions of the revolution of the disc 18.

In the normal position of the parts, the brushes 47ª and 48ª are in engagement respectively with the strips 47 and 48, and the relay coil 44 will be energized so as to maintain the light circuit L. C. closed. Assuming the relatively short lights out period to have been selected by closing of the selector switch blade 53 on the switch contact 51, one side of the coil 44 will be connected to the power line H1 by means of the conductor 54, the switch 52, the conductor 50, the strips 47 and 46, the brushes 47ª and 46ª, the conductor 49, the conductor 38, the switch blade 39 and the conductor 40. The other side of the coil 44 will be connected to the power line H2 by the conductor 42 and the switch blade 43.

Before the motor M begins to operate, the brush 47ª will be so positioned that it will break contact with the associated strip 47 as soon as the disc 18 begins to turn clockwise as viewed in Figure 5. Substantially immediately after the disc 18 begins to operate, the brush 47ª breaks contact with the segment 47, thus de-energizing the coil 44 and allowing the relay contactors 37 and 41 to open so as to de-energize the light circuit L. C. The coil 44 will remain de-energized and the lights will remain out while the brush 47ª is turning through the relatively short arc $a$ indicated in Figure 4. When the brush 47ª makes contact again with the strip 47 at the other end of the arc $a$, the circuit controlling the relay coil 44 will be re-established, thus energizing the light circuit L. C.

If it is desired that the lights remain out during a relatively long period, the selector switch blade 53 is shifted to engage the switch point 56, thereby placing the relay coil 44 under the control of the brush 48ª and the relatively short strip 48. The operation is similar to the operation during a relatively short lights out period described above, but a relatively longer lights out period ensues because of the longer time required for the brush 48ª to move through the relatively long arc $b$ indicated in Figure 4 at the end of which the brush 48ª re-contacts the strip 48.

It will be observed that although the apparatus may be set or conditioned to provide for turning out the lights for a relatively short or a relatively long period, either selected period begins at exactly the same time and the selected period, either long or short, will end before the motor driven mechanism M has operated through a complete revolution or cycle.

*Chime circuit controls*

During the lights out period, switching mechanism is operative for effecting a succession of strokes of the chimes. In the form shown, one side of the chime equipment C. E. is connected by a conductor 58 to the transformer terminal S1. The other side of the equipment C. E. leads through a conductor 59 to a spring blade 60 mounted to press against one side of the disc 17 and to make contact sequentially with a plurality of conducting pins 61 extending through the disc 17 so as to be engageable by the spring blade 60. The pins 61 are also engageable by a second spring blade 62 mounted to press against the opposite face of the disc 17. The spring blade 62 is connected to a conductor 63 which leads to the transformer terminal S3. Each time one of the pins 61, eleven being shown, bridges the spring blades 60 and 62, the chime equipment C. E. will be connected across the transformer terminals S1 and S3 so as to effect one operation of the chimes. The pins 61 are so located with respect to the segments or strips 47 and 48 on the disc 45 that the chime operations will take place during the lights out period.

*Stopping at end of cycle*

It is desirable that when the lights out period, either long or short, is over, all parts except the clock C be stopped in their normal or full cycle positions in readiness for the performance of another cycle of operations to begin exactly 24 hours after the commencement of the last completed cycle. For accomplishing this purpose, mechanism including the switches 32 and 12—13 is provided for operating the stopping relay 26 at the end of a complete revolution of the motor driven disc 17, the operation of the relay 26 causing the relay 22, which was closed at the beginning of the cycle, to be opened. In the form shown, the switch 32, which is normally closed when the parts are in their full-cycle positions, includes a resilient short arm 65, and a resilient long arm 66 which tends to move away from the arm 65 so as to break contact with the latter. Normally, however, a cycle stopping part, e. g. a pin 67 on the disc 17 engages the arm 66 and holds it in electrical contact with the arm 65. When a cycle starts and the disc 17 begins to rotate in the manner previously described, the pin 67 moves clockwise as viewed in Figure 3 beyond the switch arm 66 so as to release the latter and permit it to move away from the arm 65. A conductor 68 leads from the switch blade 66 to one end of the coil 69 of the relay 26, the other end of the coil 69 being connected through the conductors 3 to the power line H-1. The switch blade 65 is connected to a conductor 70 which leads through a flexible conductor 71 to the rockable arm 10 mounted on the clock mechanism.

Normally when the parts are in their full-cycle positions the switch 65—66 is closed but the switch 12—13 associated with the arm 10 is open. As previously stated, when the clock finger 6 rocks the arm 10, the stop-conditioning switch 12—13 is closed. However, the closing of the switch 12—13 is delayed until after the pin 67 on the disc 17 has moved beyond the switch arm 66 so as to effect opening of the switch 65—66. Consequently when the parts are in their normal positions, the circuit including the relay coil 69 is open at the switch 12—13; and by the time the switch 12—13 is closed, the switch 65—66, which is in series with the stop-conditioning switch 12—13, will be open. Thus, at the beginning and during most of an operating cycle the relay coil 69 will remain de-energized. When the disc 17 approaches a return to its full-cycle position, the switch 12—13 will still be held closed by the relatively slowly moving clock pointer 6 so that when the pin 67 on the disc 17 re-engages the switch arm 66 and closes the switch 65—66 both series connected switches 12—13 and 65—66 will be closed. This will establish a circuit through the relay coil 69 beginning at the line H1 and extending through the conductors 3, the coil 69, the conductor 68, the switch arm 66, the switch arm 65, the conductor 70, the flexible conductor 71, the arm 10, the switch 12—13, the conductors 4 and 5, and the ground G. Energizing of the relay coil 69, thus effected, will open the relay 26 so as to de-energize the coil 23 of the relay 22, thereby breaking the circuit to the motor driven mechanism M and bringing all of the parts to rest in their full cycle positions. After the completion of a cycle, the clock pointer 6 will move beyond the tip 10a on the switch arm 10 so as to permit both the switches 7 and 12—13 to open so that the parts will remain in their normal positions until the pointer 6 re-engages the arm tip 10a at the same time the next day.

By turning the screw 12, its position on the arm 10 can be adjusted or set so as to be relatively close to or relatively far from the contact finger 13 when the arm 10 is in its normal position shown in Figure 1. If the screw 12 is adjusted to be relatively close to the finger 13, the stop-conditioning switch 12—13 will be closed relatively soon after closing of the switch 7, for example before the pin 67 on the disc 17 completes a single revolution and re-closes the switch 32. With such an adjustment, the switches 12—13 and 32 will cooperate to stop the motor driven switching mechanism when the switch 32 is closed at the completion of a single cycle. If the adjustable screw 12 is set to be a little farther from the contact strip 13, the closing of the switch 12—13 will be delayed until after the pin 67 has made a complete revolution and has then moved past the switch 32, the re-closing of the switch 32 at the end of the first cycle being ineffective for stopping the apparatus, because at this time the switch 12—13 will still be open. The switch 12—13 will, however, close during the second cycle, after the switch 32 has been opened again. Consequently, when the switch 32 is closed at the end of the second cycle, both switches 12—13, and 32 will be closed and the apparatus will be stopped. By suitable other adjustments of the screw 12, the number of cycles thus performed sequentially may be varied or selected at will, limited only by the time the finger 6 remains in contact with the arm tip 10a following closing of the switch 7.

*Manual starting of cycle*

It may sometimes be desired to start a cycle of operation manually independently of the time-initiated operation normally effected by the clock C, the manually initiated cycle, however, once having been started, being continued and effecting the same sequence of operations as the time-controlled operations previously described. In the form shown, mechanism for initiating a cycle irrespective of the time of day includes a momentarily operable switch, such as a push button 72 shunted across the conductors 27 and 30 so as thus to be shunted across the mercury switch 7. Closing of the push button switch 72 will have the same effect as closing of the switch 7, normally caused by the clock mechanism C; and a cycle or sequence of operations will be started in the same manner as when the switch 7 is closed by the clock C.

In order that it will not be necessary to retain the switch 72 manually closed during a cycle, and in order that the cycle may be stopped at the proper time, a holding control comprising a switch 73 is shunted across the conductors 27 and 30. The switch 73 includes blades 74 and 75 which are spring-urged toward engagement with each other but which are normally held disengaged by a pin 76 on the disc 19 engaging the switch blade 74 and holding it in the position shown in Figure 6. When a cycle has been started by closing of the push button switch 72, the motor mechanism M will rotate the disc 17 so as to move the pin 76 beyond the switch blade 74, thereby releasing the latter and enabling it to contact the switch blade 75, shunting the conductors 27 and 30 through conductors 77 and 78, and thus shunting the mercury switch 7. This will take place very shortly after the initial depression of the push button 72 so that the latter may be released and opened after being held depressed for only a moment, the switch 73 then maintaining the mercury switch 7 shunted throughout the remainder of the cycle. When the cycle has been completed, the disc 19 and pin 76 will have returned to the positions shown in Figure 6 in which the pin 76 has engaged the switch blade 74, thus opening the switch 73 and breaking the circuit through the relay coil 23 so as to open the relay 22 and break the circuit through the motor mechanism M, thus bringing the parts to rest in their normal or full-cycle positions.

The apparatus disclosed by way of example embodies the invention in a preferred form, but it is intended that the disclosed apparatus be illustrative rather than definitive of the invention, which is defined in the accompanying claims.

I claim:

1. In a programming apparatus, a main electrical circuit to be controlled in accordance with a predetermined program; an adjustable control device for said circuit; switch operating mechanism for effecting adjustment of said control device; an electric motor for driving said mechanism; a normally open relay in circuit with said motor and having a coil energizable for closing said relay; a clock; a first normally open switch operable by said clock at a predetermined time in each clock cycle for effecting energizing of said relay coil to close said relay and thus close a circuit through said motor; a normally closed relay in circuit with the coil of said normally open relay and having a coil energizable for opening said normally closed relay to thereby de-energize the coil of said normally open relay to break the motor circuit; a second normally open switch operable by said clock a predetermined time after operation of said first normally open switch; a normally closed switch; means connecting said second normally open switch and said normally closed switch in circuit with the coil of said normally closed relay; and cycle stopping means normally maintaining said normally closed switch closed in the full cycle position of said mechanism and being operable by said mechanism in the initial part of a cycle thereof for opening said normally closed switch prior to the closing of said second normally open switch; said cycle stopping means being operable after the closing of said second normally open switch and near the end of a cycle for re-closing said normally closed switch whereby said normally closed switch and said second normally open switch are both closed, said normally closed relay is opened, and said normally open relay is restored to open condition to stop said motor and said mechanism at the end of a cycle.

2. In a programming apparatus, a main electrical circuit to be controlled in accordance with a predetermined program; a control device for said circuit; a cyclically operable shaft; an electric motor for driving said shaft; means including a device carried by said shaft and operable during a single continuous rotative cycle thereof for adjusting said control device from normal condition to another condition and then re-adjusting said device to normal condition for thereby effecting programmed control of said circuit; means including an electric switch for starting said motor to initiate a continuous rotative cycle of said shaft; and means for stopping said motor at the end of a single continuous rotative cycle of said shaft comprising a second electric switch which is open at the beginning of a cycle, means for closing said second switch during a cycle and maintaining it closed until after the end of the cycle, a third electric switch in series with said second switch and which is closed at the beginning of a cycle, and a device operable by said motor in time with said shaft for opening said third switch during a cycle prior to the closing of said second switch, and for re-closing said third switch near the end of a cycle.

3. In a programming apparatus, a main electrical circuit to be controlled in accordance with a predetermined program; a control device for said circuit; a cyclically operable shaft; an electric motor for driving said shaft; means including a device carried by said shaft and operable during a single continuous rotative cycle thereof for adjusting said control device from normal condition to another condition and then re-adjusting said device to normal condition for thereby effecting programmed control of said circuit; means including an electric switch for starting said motor to initiate a continuous rotative cycle of said shaft; and means for stopping said motor at the end of a single continuous rotative cycle of said shaft comprising a second electric switch which is open at the beginning of a cycle, means for closing said second switch during a cycle and maintaining it closed until after the end of the cycle, a third electric switch in series with said second switch, and a pin carried by said shaft and being engaged with said third switch in the full cycle position of said shaft for maintaining said third switch closed and being disengageable from said third switch during a cycle for opening said third switch before closing of said second switch, said pin being again engageable with said third switch just before the end of a cycle for re-closing said third switch.

4. In a programming apparatus, a main electrical circuit to be controlled in accordance with a predetermined program; a control device for said circuit; a cyclically operable shaft; an electric motor for driving said shaft; means including a device carried by said shaft and operable during a single continuous rotative cycle thereof for adjusting said control device from normal condition to another condition and then re-adjusting said device to normal condition for thereby effecting programmed control of said circuit; means including a first electric switch and a clock for operating said switch for starting said motor to initiate a continuous rotative cycle of said shaft; and means for stopping said motor at the end of a single continuous rotative cycle of said shaft comprising a second electric switch which is open at the beginning of a cycle, means operable by said clock for closing said second switch during a cycle and maintaining it closed until after the end of the cycle, a third electric switch in series with said second switch and which is closed at the beginning of a cycle, and a device operable by said motor in time with said shaft for opening said third switch during a cycle prior to the closing of said second switch, and for re-closing said third switch near the end of a cycle.

5. In a programming apparatus, a main electrical circuit to be controlled; an electrically operable control device for said circuit; an electric motor; a shaft drivable by said motor; means operable by said shaft for effecting operation of said control device; and means for automatically starting said motor and stopping it after a complete revolution of said shaft comprising a clock, a first switch operable by said clock for controlling the starting of said motor, a normally open second switch closable by said clock after said first switch has been operated and rotation of said shaft has started, a normally closed third switch in series with said second switch, means for opening said third switch at the beginning of a shaft revolution prior to closing of said second switch by said clock, means operable by said shaft for re-closing said third switch near the end of the shaft revolution, and means operable in dependence upon said second and third switches both being closed near the end of a cycle for disabling the control of said first switch and thereby stopping said motor.

6. In a programming apparatus, a main electrical circuit to be controlled in accordance with a predetermined program; a control device for said circuit; a cyclically operable shaft; an electric motor for driving said shaft; means including a device carried by said shaft and operable during a single continuous rotative cycle thereof for adjusting said control device from normal condition to another condition and then re-adjusting said device to normal condition for thereby effecting programmed control of said circuit; a clock; means including an electric switch operable by said clock for starting said motor to initiate a continuous rotative cycle of said shaft; and means for stopping said motor at the end of a single continuous rotative cycle of said shaft comprising a second electric switch which is open at the beginning of a cycle, means operable by said clock for closing said second switch during a cycle and maintaining it closed until after the end of the cycle, a third electric switch in series with said second switch and which is closed at the beginning of a cycle, a device operable by said motor in time with said shaft for opening said third switch during a cycle prior to the closing of said second switch, and for re-closing said third switch near the end of a cycle, and means for varying the interval between operation of said motor starting electric switch and closing of said second electric switch by said clock for varying the number of cycles which will be performed before both said second and third electric switches are closed and the motor thereby stopped.

7. In a programming apparatus, a normally closed electrical circuit, and a normally open electrical circuit to be controlled in accordance with a predetermined program; control means for said normally open circuit; a cyclically operable shaft; a motor for driving said shaft; means operable during a single continuous rotative cycle of said shaft for adjusting said control means from normal condition to another condition and then readjusting such means to normal condition for thereby effecting programmed control of said normally open circuit; means subject to control by said last-named means for opening said normally closed circuit during each continuous rotative cycle of said shaft; means for starting said motor to initiate a continuous rotative cycle of said shaft; and means rotatable by said shaft and effective at the end of each such rotative cycle thereof for stopping said motor, opening said normally open circuit and closing said normally closed circuit.

JOSEPH CALVI.

References Cited in the file of this patent

UNITED STATES PATENTS

| Number | Name | Date |
|---|---|---|
| 1,796,906 | Zimmer | Mar. 17, 1931 |
| 1,820,252 | Shippy | Aug. 25, 1931 |
| 1,865,604 | Yarnall | July 5, 1932 |
| 1,868,801 | Munz | July 26, 1932 |
| 2,100,284 | Kriechbaum | Nov. 23, 1937 |
| 2,185,394 | Arbogast | Jan. 2, 1940 |
| 2,254,795 | Daniels | Sept. 2, 1941 |
| 2,318,969 | Reynolds | May 11, 1943 |